J. G. COFMAN.
SAW-FEEDERS.
No. 194,581. Patented Aug. 28, 1877.
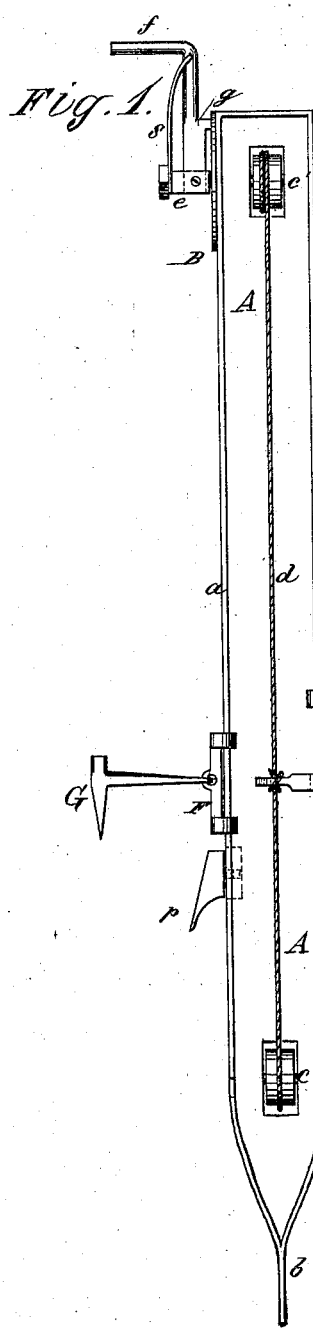
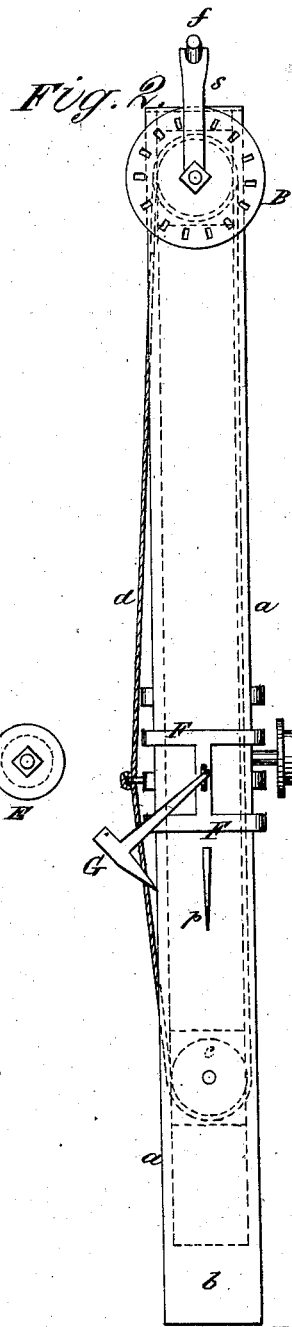
WITNESSES:
H. Rydquist
J. H. Scarborough
INVENTOR:
J. G. Cofman
BY
ATTORNEYS.

UNITED STATES PATENT OFFICE.

JAMES G. COFMAN, OF PIERPONT, MICHIGAN.

IMPROVEMENT IN SAW-FEEDERS.

Specification forming part of Letters Patent No. 194,581, dated August 28, 1877; application filed July 30, 1877.

*To all whom it may concern:*

Be it known that I, JAMES G. COFMAN, of Pierpont, in the county of Manistee and State of Michigan, have invented a new and Improved Saw-Feeder, of which the following is a specification:

This invention relates to devices which are designed to hold a hand-saw down to its work during the operation of cross-cutting logs.

The nature of my invention consists in combining, with a spike, an adjustable spring-roller and one or more dogs, so arranged that when the spike is driven into the ground alongside of a log, and the latter firmly secured thereto, one man can conveniently manage a hand-saw in the operation of cross-cutting, as will be hereinafter explained.

In the annexed drawing, Figure 1 is a side elevation of the improved saw-feeder. Fig. 2 is a front view.

Similar letters of reference indicate corresponding parts.

The letter A designates a spike, which is preferably made of hard wood, covered on two sides with stout sheet metal, that forms flanges $a$ and a sharp entering-point, $b$. At the upper and lower ends of the spike A are pulleys $c$ $c'$, around which an endless rope or chain, $d$, passes. On the shaft $e$ of the pulley $c'$ a hand-crank, $f$, is pivoted, which is constructed with a tooth, $g$, that is held in one or the other of a number of holes in a circular plate B by means of a spring, $s$. The rope $d$ is passed two or more times around the pulley $c'$, so that it will not slip during the operation of sawing. The rope $d$ is attached to a slide, C, which embraces the flanges $a$ on one side of the spike, and to which is secured a curved spring-arm, D, bearing on its end a flanged anti-friction roller, E. This roller E is arranged a little to one side of the spike, as shown in Fig. 2, and presses upon the bowed back of the saw, holding it down to its work and guiding it.

The sawyer regulates the pressure of the roller on the saw by means of the crank and its attachments, which are just in front of him while at work.

On the front side of the spike, or that side opposite to the slide C, is another slide, F, to which a dog, G, is pivoted, and beneath this dog is a spur, $p$, which is directed downward, as shown. When the spike is driven into the ground alongside of a log, the latter is firmly secured to the spike by the means described. The saw is then started into the log, and the roller E adjusted down upon it, and kept down with the required pressure during the entire operation. The spur $p$ is detachable from the spike, and is used when the log is too high for the spike to be driven into the ground. In such case the spur $p$ is driven into the log and holds fast the spike.

Having thus described my invention, I claim as new and desire to secure by Letters Patent—

In combination with a spike, A, the adjustable anti-friction roller E, applied to a spring-arm, and the adjustable dog G, substantially as described.

JAMES GURRAD COFMAN.

Witnesses:
 ASA J. PATCH,
 JOSIAH HILLIARD.